United States Patent

[11] 3,585,977

[72] Inventor Yutaka Masaoka
       Hamakita-shi, Japan
[21] Appl. No. 811,035
[22] Filed Mar. 27, 1969
[45] Patented June 22, 1971
[73] Assignee Yamaha Hatsudoki Kabushiki Kaisha
       Shizuoka-ken, Japan
[32] Priority Mar. 30, 1968
[33] Japan
[31] 43/25106

[54] DRIVE ARRANGEMENT FOR DRIVING AN OIL PUMP OF VARIABLE SPEED OUTPUT, COMPACT ENGINES
3 Claims, 4 Drawing Figs.
[52] U.S. Cl.............................................. 123/196, 184/6, 184/27
[51] Int. Cl............................................... F16n 13/10
[50] Field of Search........................................ 184/6, 6 Y, 27; 417/362; 123/196; 230/15

[56] References Cited
UNITED STATES PATENTS

| | | | |
|---|---|---|---|
| 2,504,499 | 4/1950 | Cloud | 184/6 X |
| 2,773,562 | 12/1956 | Thomas | 184/27 |
| 3,062,320 | 11/1962 | Armstrong | 184/27 X |
| 3,137,285 | 6/1964 | Ausserbauer | 123/196 X |
| 3,302,752 | 2/1967 | Shiokang | 184/6 |
| 3,448,829 | 6/1969 | Rauh et al | 184/27 |

Primary Examiner—Manuel A. Antonakas
Attorney—Flynn and Frishauf

ABSTRACT: The input shaft of an oil pump extends from the pump casing in parallel to the power takeoff shaft of a two-cycle engine. The shaft has conical discs of a variable speed drive attached thereto. An endless-belt drive belt is stretched within the outline of the conical disc from a pulley on the drive shaft to the pump pulley, so that the pulleys are placed inside the disc for protection and to form a compact structure.

3,585,977

DRIVE ARRANGEMENT FOR DRIVING AN OIL PUMP OF VARIABLE SPEED OUTPUT, COMPACT ENGINES

BACKGROUND OF THE INVENTION

This invention relates to a variable speed output compact engine and more particularly to an arrangement for driving an oil pump of an internal combustion engine for miniature vehicles from the power takeoff shaft of the engine.

It is known to connect the input shaft of an oil pump with the crank shaft of two-cycle engines through toothed transmission gears and supplying the intake passage of the two-cycle engine with lubricating oil.

However, in miniature vehicles, particularly in a miniature snow vehicle having a variable speed sheave drive interposed between the crankshaft and drive axle, it is impossible to drive the oil pump by the above-mentioned connection.

If the oil pump transmission gears are contained in the crank casing, the cover of the crank casing has to be removed therefrom each time lubrication, inspection or maintenance is carried out for the transmission gears themselves. If the transmission gears were positioned outside of the crank casing, the simplicity and compactness of the miniature vehicle would be harmfully affected since such gears occupy a large space.

It is an object of this invention to provide an arrangement for driving an oil pump of the engine for a miniature vehicle having a variable speed sheave drive capable of being easily inspected and maintained, and so improved as to utilize an otherwise dead space to improve the compactness of the miniature vehicle engine.

SUMMARY OF THE INVENTION

The power takeoff shaft of an engine is fitted with a driving member of a sheave drive-type stepless speed change arrangement. An axially movable conical sheave disc and a conical sheave disc are rigidly secured to the power takeoff shaft; the fixed disc is located at a position nearer to the engine side than to the movable conical sheave disc, and includes a driving belt pulley integrally formed with the boss of said stationary conical sheave disc at the engine side, and extending within the axial outline of the conical sheave disc. A driven belt pulley is attached to the input shaft of the oil pump extending parallel to the power takeoff shaft, fitting inside the space of the fixed conical sheave disc. An endless belt is stretched from the driving pulley to the driven pulley.

BRIEF EXPLANATION OF THE DRAWINGS

This invention can be more fully understood from the following detailed description when taken in connection with the accompanying drawings, in which:

FIG. 4 is a perspective view of a cam member in said oil pump.

DETAILED DESCRIPTION OF THE PREFERRED EMBODIMENTS

Figure 1:
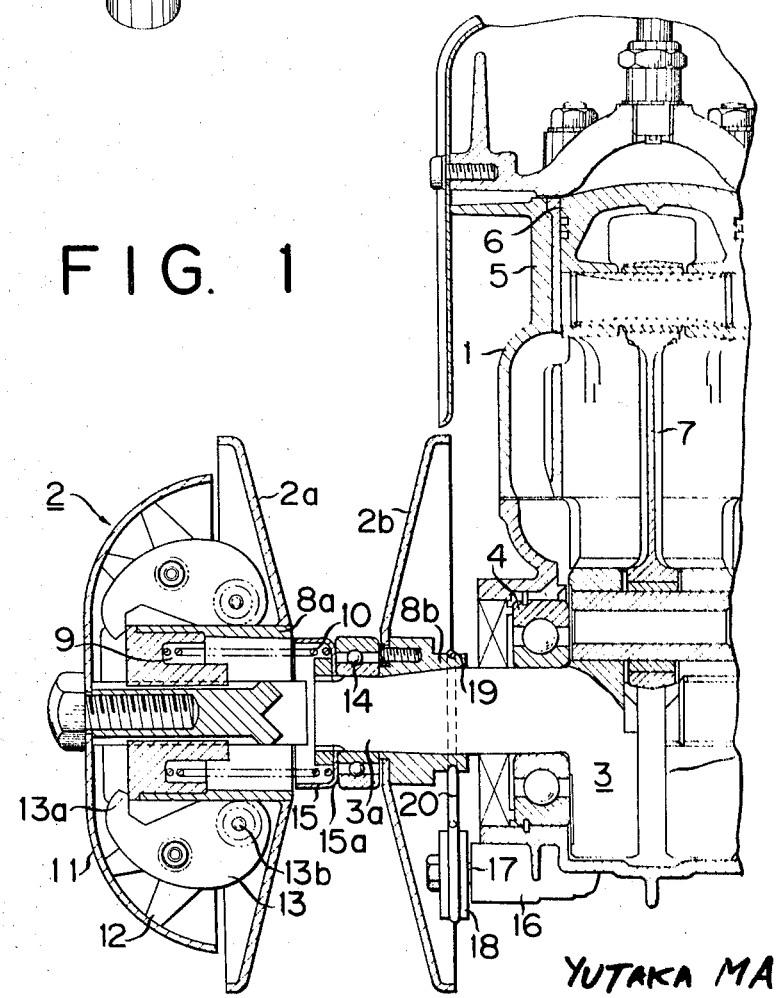
FIG. 1 is a cross-sectional view of a driving device of an oil pump embodying this invention with associated parts of an engine and a variable speed sheave drive-type speed changer.

FIG. 1 indicates the crank casing 1 of a two-cycle engine attached to a miniature snow vehicle body (not shown), and the driving sheave 2 of a variable speed sheave drive. In the crank casing 1 is rotatably disposed a crankshaft 3 supported by bearings 4. To the upper end of said crank casing 1 is secured a cylinder 5 in which a piston 6 is slidably disposed. A piston rod 7 interconnects the piston 6 and crankshaft 3 to convert the reciprocation of the piston 6 into rotation of the crankshaft 3. The left end portion of crankshaft 3 extends outside of the crank casing 1 and acts as a power takeoff shaft 3a. To the power takeoff shaft 3a is fitted the aforementioned driving sheave 2 which consists of two sheave halves; an axially movable conical sheave disc or member 2a and a stationary conical sheave disc or member 2b. Said sheave halves 2a and 2b respectively include a boss and are formed into a conical disc-shaped member. The boss 8a of the axially movable conical sheave member 2a is splined at its inside surface so as to fit in with the splined portion of the power takeoff shaft 3a formed at the extreme end portion thereof. The boss 8a has an annular recess 9 opened outside thereof at the right end and a compressible coiled spring 10 is positioned in said recess 9.

To the extreme end of the power takeoff shaft 3a is rigidly attached a cover 11 in which brackets 12 are disposed so as to rotatably support cam members 13 each having a claw 13a and a mass 13b. The claw 13a is engaged with the peripheral edge of the left side of said boss 8a. A ball bearing 14 fits in with the power takeoff shaft 3a in the space formed between the sheave halves. An annular seat member 15 is rigidly secured to the power takeoff shaft 3a by means of a nut 15a and pressed to the left side of said ball bearing 14. Between the seat member 15 and the bottom of the recess 9 is positioned the aforementioned spring 10 in a compressed state. The boss 8b to which the sheave half 2b is separably secured is rigidly mounted on the power takeoff shaft 3a.

To the outer bottom portion of said crank casing 1 is attached a casing 16 of an oil pump. The input shaft 17 of said oil pump extends outside of said casing 16 in parallel to the power takeoff shaft 3a. A driven pulley 18 is rigidly fitted to said input shaft 17, and a driving pulley 19 is integrally formed with the boss 8b at the engine side. An endless belt 20 is stretched between the driving and driven pulleys 19 and 18 respectively and located, as seen in FIG. 1, in back of sheave 8b and within its axial outline. The oil pump is driven by the two-cycle engine by rotation of the crankshaft 3 transmitted to the input shaft of said oil pump through the driving pulley 19, endless belt 20 and driven pulley 18, so that the lubricating oil is supplied from the pump to the intake passage of said two-cycle engine separately from a fuel supply so as to lubricate the desired portions of said engine.

Figure 2:
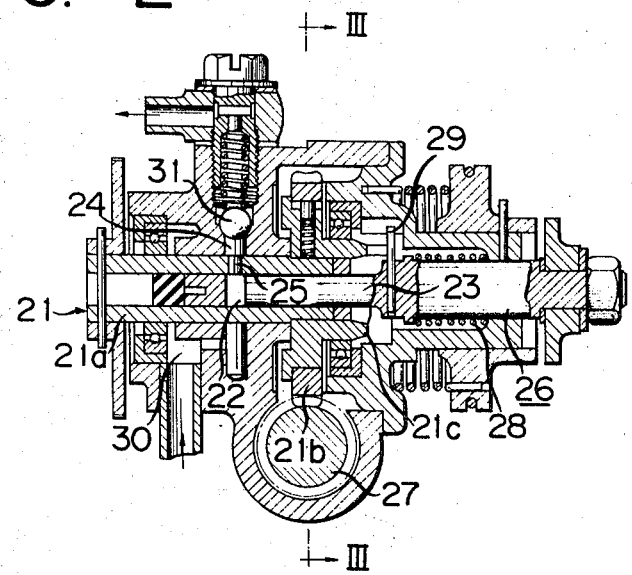
FIG. 2 is a cross-sectional view of the oil pump.
Figure 3:
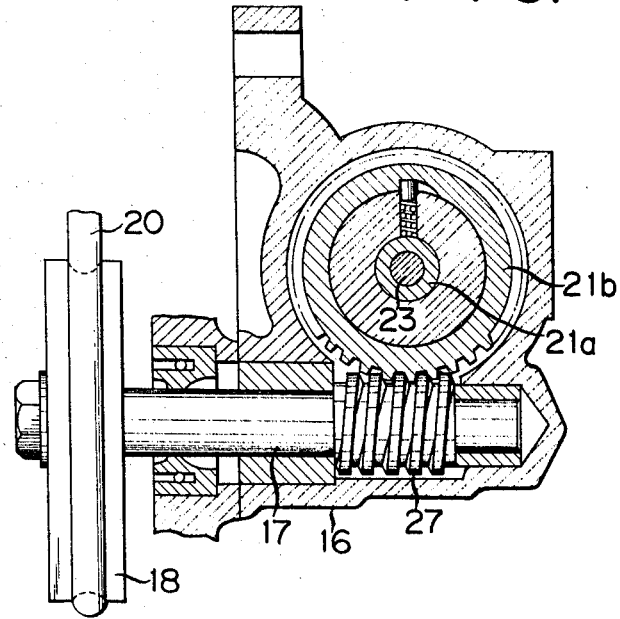
FIG. 3 is a cross-sectional view of the oil pump taken along a line III–III of FIG. 2.

The oil pump may be of the general type such as a lubricating pump for a two-cycle gasoline internal combustion engine. The oil pump, for instance, is constructed as shown in FIGS. 2, 3 and 4. In the pump casing 16 is rotatably disposed a distributor 21 which has a hollow cylindrical member 21a and a worm wheel 21b. The cylindrical member 21a has an axial bore 22 into which a piston member 23 is slidably inserted and which communicates with an outlet port 24 through a bore 25 formed in the sidewall of the cylindrical member. Piston member 23 has a plunger part 26. The worm wheel 21b is interlocked with a worm 27 formed on the input shaft 17 and has an annular cam surface 21c formed at the right-hand side thereof, which is undulated in the axial direction of said cylindrical member 21a as shown in FIG. 4. Plunger 26 is urged toward the left side by means of a coil spring 28 and has a guide pin 29 which slides along an undulated surface of the worm wheel 21b as said worm wheel rotates, thus causing the plunger 26 to reciprocate. An inlet port of the pump is indicated by the reference numeral 30 in FIG. 2. A check valve for preventing the oil from flowing back from the outlet of the pump into the outlet port 24 is indicated by the reference numeral 31. The inlet port 30 communicates with an oil tank (not shown).

In operation, the rotation of the power takeoff shaft is transmitted to the worm wheel 21b by mediums of the driving and driven pulleys, belt, input shaft and the worm. The bore 25 alternately communicates with the inlet port 30 and outlet port 24 each time the worm wheel 21b is driven by half a rotation. During such half a rotation, the piston member 23 is driven by half a reciprocation stroke with the guide pin 29 sliding along the undulated surface of the worm wheel. Consequently, the oil is supplied from the inlet to the outlet of said pump as generally known.

What I claim is:

1. Variable speed output, compact internal combustion engine having an output pulley (2) directly coupled to the crankshaft (3) of the engine, an oil pump (16) and means (18, 19, 20) drivingly interconnecting the oil pump and the engine;

said output pulley (2) comprising a first conical disc sheave (26) rigidly secured to the crankshaft (3) to rotate therewith;

a second conical disc sheave (2a) splined to the crankshaft (3) to be axially movable thereon while being rotatable therewith, the conical points of said sheaves facing each other to provide a variable speed output drive;

said first, rigidly secured sheave (2b) being located adjacent the cylinder housing (1) of the engine and having an axially extending boss (8b) extending over the shaft (3) within the axial length of the first sheave (2b);

drive pulley means (19) formed on said boss within the axial length of the sheave pump pulley means (18) extending from said oil pump (16)

and driving interconnecting means (20) interconnecting said pulley means (18, 19), said pump pulley means extending into the space beneath said first conical sheave (26) in parallel alignment with said drive pulley means (19)

whereby said oil pump drive means (18, 19, 20) will be shrouded by and located within the axial space of said first conical disc sheave (26).

2. Engine according to claim 1 wherein said second axially movable sheave 2a) is axially removably mounted on said shaft (3);

and said first rigidly secured sheave (2b) and said boss within the axial length of the shaft are separable elements to permit removal of said sheaves from said shaft and provide for access to said driving interconnecting means behind said first sheave.

3. Engine according to claim 1 in which the engine is of the two-cycle type, and the lubricating oil is supplied from the oil pump to the intake passage of said two-cycle engine separately from a fuel supply.

UNITED STATES PATENT OFFICE
CERTIFICATE OF CORRECTION

Patent No. 3,585,977            Dated June 22, 1971

Inventor(s) Yutaka MASAOKA

It is certified that error appears in the above-identified patent and that said Letters Patent are hereby corrected as shown below:

Column 3, line 4, change "(26)" to --(2b)--;

Column 4, line 2, change "(26)" to --(2b)--;

Column 4, line 6, change "(26)" to --(2b)--.

Signed and sealed this 13th day of June 1972.

(SEAL)
Attest:

EDWARD M. FLETCHER, JR.
Attesting Officer

ROBERT GOTTSCHALK
Commissioner of Patents